US008314792B2

(12) United States Patent
Von Berg et al.

(10) Patent No.: US 8,314,792 B2
(45) Date of Patent: Nov. 20, 2012

(54) PREDICTION OF CARDIAC SHAPE BY A MOTION MODEL

(75) Inventors: Jens Von Berg, Hamburg (DE); Cristian Lorenz, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 925 days.

(21) Appl. No.: 12/306,564

(22) PCT Filed: Jul. 2, 2007

(86) PCT No.: PCT/IB2007/052559
§ 371 (c)(1),
(2), (4) Date: Dec. 24, 2008

(87) PCT Pub. No.: WO2008/004171
PCT Pub. Date: Jan. 10, 2008

(65) Prior Publication Data
US 2009/0231335 A1   Sep. 17, 2009

(30) Foreign Application Priority Data
Jul. 5, 2006 (EP) .................................. 06116648

(51) Int. Cl.
*G06T 17/00* (2006.01)
*G06T 17/20* (2006.01)
*G06T 17/30* (2006.01)
(52) U.S. Cl. ........ 345/420; 345/419; 382/129; 382/131; 382/151
(58) Field of Classification Search .................. 345/419, 345/420; 382/129, 131, 151
See application file for complete search history.

(56) References Cited

U.S. PATENT DOCUMENTS 7,212,203 B2 * 5/2007 Payne ........................... 345/420
(Continued)

FOREIGN PATENT DOCUMENTS

WO   9700498 A1   1/1997
(Continued)

OTHER PUBLICATIONS

Jurgen Weese, et al: Shape Constrained Deformable Models for 3D Medical Image Segmentation, IPMI 2001, LNCS 2082, pp. 380-387, 2001. Springer-Verlag Berlin Heidelberg 2001.
(Continued)

*Primary Examiner* — Xiao M. Wu
*Assistant Examiner* — Todd Buttram

(57) ABSTRACT

The invention relates to a system (100) for propagating a model mesh based on a first mean model mesh and on a second mean model mesh, the system comprising: a registration unit (110) for computing a registration transformation for registering the first model mesh with the first mean model mesh; a forward transformation unit (120) for transforming the model mesh into a registered model mesh using the registration transformation; a computation unit (130) for computing a propagation field for propagating the registered model mesh, the propagation field comprising vectors of displacements of vertices of the second mean model mesh relative to respective vertices of the first mean model mesh; a propagation unit (140) for transforming the registered model mesh into the propagated registered model mesh based on applying the vertex displacement vectors comprised in the propagation field to respective vertices of the registered model mesh; and an inverse transformation unit (150) for transforming the propagated registered model mesh into the propagated model mesh using the inverse of the registration transformation, thereby propagating the model mesh. Using the propagation field comprising vectors of displacements of vertices of the second mean model mesh relative to respective vertices of the first mean model mesh improves modeling motion of anatomical shapes. Advantageously, the propagation field of vertex displacement vectors is straightforward to compute and to apply.

20 Claims, 7 Drawing Sheets

U.S. PATENT DOCUMENTS

| | | | | |
|---|---|---|---|---|
| 7,286,866 | B2 * | 10/2007 | Okerlund et al. | 600/407 |
| 2005/0017987 | A1 * | 1/2005 | Horita et al. | 345/629 |
| 2006/0147114 | A1 * | 7/2006 | Kaus et al. | 382/173 |
| 2008/0225044 | A1 * | 9/2008 | Huang et al. | 345/420 |
| 2008/0226149 | A1 * | 9/2008 | Wischmann et al. | 382/131 |

FOREIGN PATENT DOCUMENTS

| | | |
|---|---|---|
| WO | 2004111936 A1 | 12/2004 |
| WO | 2005027044 A1 | 3/2005 |
| WO | 2005076186 A1 | 8/2005 |

OTHER PUBLICATIONS

Jens von Berg, et al: Multi-surface Cardiac Modelling, Segmentation, and Tracking, FIMH 2005, LNCS 3504, pp. 1-11, 2005. Springer-Verlag Berlin Heidelberg 2005.

Christian Lorenz, et al: Towards a Comprehensive Geometric Model of the Heart, Function Imaging and Modeling of the Heart 2005 FIMH, LNCS 3504, pp. 102-112, 2005.

I. L. Dryden, et al: Statistical Shape Analysis, John Wiley & Sons; Chichester, UK, Oct. 1998.

Kaus, M. R., et al: Automated 3-D PDM construction from segmented images using deformable models, IEEE Transaction on Medical Imaging, vol. 22, No. 8, Aug. 2003, pp. 1005-1013.

* cited by examiner

PREDICTION OF CARDIAC SHAPE BY A MOTION MODEL

FIELD OF THE INVENTION

The invention relates to the field of medical imaging of an anatomical shape and more specifically to modeling motion of the anatomical shape.

BACKGROUND OF THE INVENTION

A method of modeling motion of the human heart is described by C. Lorenz and J. von Berg in an article entitled "Towards a comprehensive geometric model of the heart" published in FIMH, Proceeding of the Third international Workshop, pages 102-112, Springer-Verlag 2005, hereinafter referred to as Ref. 1. In this article, the human heart is described by a model mesh. The motion of the model mesh from a first phase of cardiac cycle to a second phase of cardiac cycle is described using a model space transformation. The model space transformation is estimated using smooth interpolation, e.g. thin-plate-splines interpolation, of a potentially sparse deformation field comprising displacements of a set of cardiac landmarks of a reference model, for which the displacement vectors are known. The model mesh is transformed into the reference model space and the displacement vectors of landmarks of the transformed model mesh are estimated using said smooth interpolation of the displacement vectors of landmarks of the reference model. Unfortunately, the interpolated displacement vectors introduce errors into the model of motion of the model mesh.

SUMMARY OF THE INVENTION

It would be advantageous to have a system capable of better modeling the motion of an individual mesh.

To better address this concern, in an aspect of the invention, a system for propagating a model mesh based on a first mean model mesh and on a second mean model mesh comprises:
- a registration unit for computing a registration transformation for registering the first model mesh with the first mean model mesh;
- a forward transformation unit for transforming the model mesh into a registered model mesh using the registration transformation;
- a computation unit for computing a propagation field for propagating the registered model mesh, the propagation field comprising vectors of displacements of vertices of the second mean model mesh relative to respective vertices of the first mean model mesh;
- a propagation unit for transforming the registered model mesh into the propagated registered model mesh based on applying the vertex displacement vectors comprised in the propagation field to respective vertices of the registered model mesh; and
- an inverse transformation unit for transforming the propagated registered model mesh into the propagated model mesh using the inverse of the registration transformation, thereby propagating the model mesh.

The first mean model mesh and the second mean model mesh may describe an anatomical shape at two distinct phases of motion, for example the human heart at a first phase of cardiac cycle and at a second phase of cardiac cycle. Both mean model meshes have the same mesh topology. A method for constructing a sequence of mean model meshes in a mean model space, the sequence describing the human heart at different phases of cardiac cycle, is described in an article "Multi-surface cardiac Modeling, Segmentation, and Tracking" by J. von Berg and C. Lorenz, published in FIMH, Proceeding of the Third international Workshop, pages 1-11, Springer-Verlag 2005, hereinafter referred to as Ref. 2. The model mesh may be a mesh adapted to an individual image data describing an individual human heart at the first phase of cardiac cycle. Typically, the model mesh and the mean model meshes have the same mesh topology.

The registration unit is arranged to compute the registration transformation for registering the first model mesh with the first mean model mesh. The model mesh may be embedded in the model space related to the image data space, typically a three-dimensional (3D) Euclidean space. The model mesh may be described by coordinates of its vertices in the model space coordinate system. Similarly, the first mean model mesh and the second mean model mesh may be described by coordinates of their vertices in the mean model space coordinate system, typically a 3D Euclidean space. The registration transformation may be an invertible transformation in the model mesh space, for example a similarity transformation. The forward transformation unit is arranged to transform the model mesh into the registered model mesh using the registration transformation. The computation unit is arranged to compute the propagation field for propagating the registered model mesh, the propagation field comprising vectors of displacements of vertices of the second mean model mesh relative to respective vertices of the first mean model mesh. The propagation unit is arranged to translate vertices of the registered model mesh by respective vertex displacement vectors of the computed propagation field, thereby transforming the registered model mesh into the propagated registered model mesh. The inverse transformation unit is arranged to apply the inverse of the registration transformation to the propagated registered model mesh, thereby transforming the propagated registered model mesh into the propagated model mesh. The propagated model mesh describes the individual human heart at the second phase of cardiac cycle.

Typically, the propagated model mesh based on the propagation field comprising vectors of displacements of vertices of the second mean model mesh relative to respective vertices of the first mean model mesh better describes the modeled individual human heart at the second phase of cardiac cycle than the propagated model mesh based on the propagation field comprising vectors interpolated on the basis of vectors of displacements of vertices of the second mean model mesh relative to respective vertices of the first mean model mesh described in Ref. 1. This may be due to the fact that the vertex displacements of the mean model mesh can vary dramatically from vertex to vertex. Thus, the interpolated vertex displacements can often be less accurate than the mean model vertex displacements used by the system of the invention. Consequently, the system of the invention improves modeling the motion of the individual human heart. Advantageously, the propagation field of the mean model vertex displacement vectors is straightforward to compute and to apply.

In an embodiment of the system, the system further comprises an adaptation unit for constructing the model mesh based on adapting a mesh to an image data. A suitable adaptation method for adapting triangular meshes is described in an article entitled "Shape constrained deformable models for 3D medical image segmentation" by J. Weese et al, in Proc. IPMI, pp. 380-387, Springer 2001, hereinafter referred to as Ref. 3. The adaptation unit allows further to construct the model mesh using the system of the invention.

In an embodiment of the system, the system further comprises a construction unit for constructing the first mean model mesh based on a first training image data set and for constructing the second mean model mesh based on a second training image data set. The construction unit allows constructing the first mean model mesh and the second mean model mesh using the system of the invention. A method for constructing a sequence of mean model meshes for describing the human heart at different phases of cardiac cycle is described Ref. 2.

In an embodiment of the system, the first mean model mesh describes a modeled anatomical shape at a first time moment and the second mean model mesh describes the modeled anatomical shape at a second time moment. Thus, the system may be advantageously applied to model motion of an anatomical shape, such as the human heart, described by model meshes. The timing information allows, for example, determining velocities of vertices of the model mesh.

In a further aspect of the invention, an image acquisition apparatus comprises a system for propagating a model mesh based on a first mean model mesh and on a second mean model mesh, the system comprising:
 a registration unit for computing a registration transformation for registering the first model mesh with the first mean model mesh;
 a forward transformation unit for transforming the model mesh into a registered model mesh using the registration transformation;
 a computation unit for computing a propagation field for propagating the registered model mesh, the propagation field comprising vectors of displacements of vertices of the second mean model mesh relative to respective vertices of the first mean model mesh;
 a propagation unit for transforming the registered model mesh into the propagated registered model mesh based on applying the vertex displacement vectors of the propagation field to respective vertices of the registered model mesh; and
 an inverse transformation unit for transforming the propagated registered model mesh into the propagated model mesh using the inverse of the registration transformation, thereby propagating the model mesh.

In a further aspect of the invention, a workstation comprises a system for propagating a model mesh based on a first mean model mesh and on a second mean model mesh, the system comprising:
 a registration unit for computing a registration transformation for registering the first model mesh with the first mean model mesh;
 a forward transformation unit for transforming the model mesh into a registered model mesh using the registration transformation;
 a computation unit for computing a propagation field for propagating the registered model mesh, the propagation field comprising vectors of displacements of vertices of the second mean model mesh relative to respective vertices of the first mean model mesh;
 a propagation unit for transforming the registered model mesh into the propagated registered model mesh based on applying the vertex displacement vectors of the propagation field to respective vertices of the registered model mesh; and
 an inverse transformation unit for transforming the propagated registered model mesh into the propagated model mesh using the inverse of the registration transformation, thereby propagating the model mesh.

In a further aspect of the invention, a method of propagating a model mesh based on a first mean model mesh and on a second mean model mesh comprises:
 a registration step for computing a registration transformation for registering the first model mesh with the first mean model mesh;
 a forward transformation step for transforming the model mesh into a registered model mesh using the registration transformation;
 a computation step for computing a propagation field for propagating the registered model mesh, the propagation field comprising vectors of displacements of vertices of the second mean model mesh relative to respective vertices of the first mean model mesh;
 a propagation step for transforming the registered model mesh into the propagated registered model mesh based on applying the vertex displacement vectors of the propagation field to respective vertices of the registered model mesh; and
 an inverse transformation step for transforming the propagated registered model mesh into the propagated model mesh using the inverse of the registration transformation, thereby propagating the model mesh.

In a further aspect of the invention, a computer program product to be loaded by a computer arrangement comprises instructions for propagating a model mesh based on a first mean model mesh and on a second mean model mesh, the computer arrangement comprising a processing unit and a memory, the computer program product, after being loaded, providing said processing unit with the capability to carry out the following tasks of:
 computing a registration transformation for registering the first model mesh with the first mean model mesh;
 transforming the model mesh into a registered model mesh using the registration transformation;
 computing a propagation field for propagating the registered model mesh, the propagation field comprising vectors of displacements of vertices of the second mean model mesh relative to respective vertices of the first mean model mesh;
 transforming the registered model mesh into the propagated registered model mesh based on applying the vertex displacement vectors of the propagation field to respective vertices of the registered model mesh; and
 transforming the propagated registered model mesh into the propagated model mesh using the inverse of the registration transformation, thereby propagating the model mesh.

Modifications and variations thereof, of the image acquisition apparatus, of the workstation, of the method, and/or of the computer program product, which correspond to modifications of the system and variations thereof, being described, can be carried out by a skilled person on the basis of the present description.

The skilled person will appreciate that the method may be applied to three-dimensional (3D) image data and four-dimensional (4D) time-dependent image data acquired by various acquisition modalities such as, but not limited to, conventional X-Ray, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

The same reference numerals are used to denote similar parts throughout the Figures.

DETAILED DESCRIPTION OF EMBODIMENTS

Figure 1:
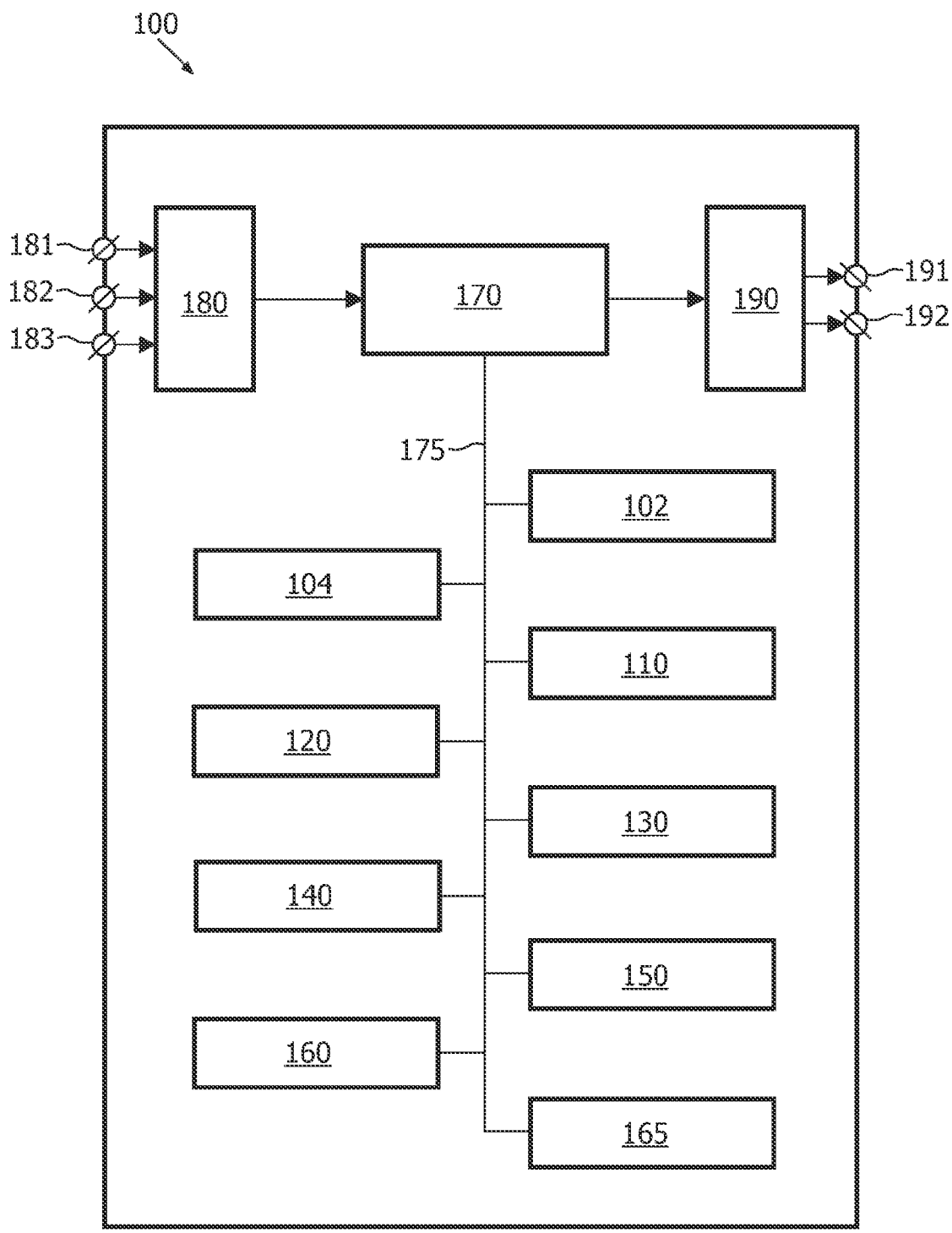
FIG. 1 schematically shows a block diagram of an exemplary embodiment of the system.

FIG. 1 schematically shows a block diagram of an exemplary embodiment of the system for propagating a model mesh based on a first mean model mesh and on a second mean model mesh, the system comprising:

- a registration unit 110 for computing a registration transformation for registering the first model mesh with the first mean model mesh;
- a forward transformation 120 unit for transforming the model mesh into a registered model mesh using the registration transformation;
- a computation unit 130 for computing a propagation field for propagating the registered model mesh, the propagation field comprising vectors of displacements of vertices of the second mean model mesh relative to respective vertices of the first mean model mesh;
- a propagation unit 140 for transforming the registered model mesh into the propagated registered model mesh based on applying the vertex displacement vectors of the propagation field to respective vertices of the registered model mesh; and
- an inverse transformation unit 150 for transforming the propagated registered model mesh into the propagated model mesh using the inverse of the registration transformation, thereby propagating the model mesh.

The exemplary embodiment of the system 100 further comprises the following optional units:

- an adaptation unit 102 for constructing the model mesh based on adapting a mesh to an image data;
- a construction unit 104 for constructing the first mean model mesh based on a first training image data set and for constructing the second mean model mesh based on a second training image data set;
- a control unit 160 for controlling the workflow in the system 100;
- a user interface 165 for communicating with a user of the system 100; and
- a memory unit 170 for storing data.

In the exemplary embodiment of the system 100, there are three input connectors 181, 182 and 183 for the coming in data. The first input connector 181 is arranged to receive data coming in from data storage such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In the exemplary embodiment of the system 100, there are two output connectors 191 and 192 for the outgoing data. The first output connector 191 is arranged to output the data to data storage such as a hard disk, a magnetic tape, a flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analogue telephone network.

In the exemplary embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows a quick access to relevant data portions by the units of the system 100. The input data may comprise, for example, the model mesh, the first mean model mesh, and the second mean model mesh. Alternatively, the input may comprise the mesh for constructing the model mesh, the image data for constructing the model mesh based on adapting the mesh to said image data, the first set of training images for constructing the first mean model mesh, and the second set of training images for constructing the second mean model mesh. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the propagated model mesh. The memory unit 170 is also arranged to receive data from and to deliver data to the units of the system 100 comprising the adaptation unit 102, the construction unit 104, the registration unit 110, the forward transformation unit 120, the computation unit 130, the propagation unit 140, the inverse transformation unit 150, the control unit 160, and the user interface 165 via a memory bus 175. The memory unit 170 is further arranged to make the output data available to external devices via any of the output connectors 191 and 192. Storing the data from the units of the system 100 in the memory unit 170 may advantageously improve the performance of the units of the system 100 as well as the rate of transfer of the output data from the units of the system 100 to external devices.

Alternatively, the system 100 may not comprise the memory unit 170 and the memory bus 175. The input data used by the system 100 may be supplied by at least one external device, such as external memory or a processor, connected to the units of the system 100. Similarly, the output data produced by the system 100 may be supplied to at least one external device, such as external memory or a processor, connected to the units of the system 100. The units of the system 100 may be arranged to receive the data from each other via internal connections or via a data bus.

In the exemplary embodiment of the system 100 shown in FIG. 1, the system 100 comprises a control unit 160 for controlling the workflow in the system 100. The control unit may be arranged to receive control data from and to provide control data to the units of the system 100. For example, after the registration transformation is computed by the registration unit 110, the registration unit 110 may be arranged to provide a control data "the registration transformation is computed" to the control unit 160 and the control unit 160 may be arranged to provide further control data "transform the model mesh" to the forward transformation unit 120 requesting the forward transformation unit 120 to compute the registered model mesh. Alternatively, a control function may be implemented in another unit of the system 100.

In the exemplary embodiment of the system 100 shown in FIG. 1, the system 100 comprises a user interface 165 for communicating with the user of the system 100. The user interface 165 may be arranged to prompt the user for and to accept a user input for specifying a file comprising the first mean model mesh and the second mean model mesh, for example. The user interface 165 may further provide the user with an insight of the propagation field of vertex displacement vectors. Optionally, the user interface may receive a user input for selecting a mode of operation of the system 100 such as of a mode for using the adaptation unit for adapting the mesh to the image data. The skilled person will understand that more functions may be advantageously implemented in the user interface 165 of the system 100.

Optionally, in a further embodiment of the system 100, the system 100 may comprise an input device such as a mouse or a keyboard and/or a an output device such as a display The skilled person will understand that there exist a large number of input and output devices that can be advantageously comprised in the system 100.

The system 100 of the invention may be used for modeling motion of an anatomical shape, e.g. of a heart of an adult human. The model mesh may be a mesh adapted to an image describing the heart at a first phase of cardiac cycle, for example, at the end of the diastole. The first mean model mesh is a mesh for modeling the "mean" heart of adult humans at the end of the diastole. The first mean model mesh may be constructed using Procrustes analysis and/or principal component analysis (PCA) of a plurality of meshes describing a plurality of hearts of a plurality of adult humans. Procrustes analysis and PCA are described in a book by I. L. Dryden, and K. V. Mardia entitled "Statistical Shape Analysis", John Wiley & Sons; Chichester, UK, 1998, hereinafter referred to as Ref. 4. Each mesh from the plurality of meshes may be obtained by adapting a mesh to a training image from a plurality of training images wherein each training image describes a heart of an adult human at the end of the diastole. A method of constructing the plurality of meshes based on the plurality of training images is described by M. R. Kaus et al in an article entitled "Automated 3-D PDM Construction From Segmented Image Using Deformable Models" in IEEE Transactions on Medical Imaging, vol. 22, no. 8, 2003, hereinafter referred to as Ref. 5. The second mean model mesh for modeling the heart at a second phase, e.g. at a phase following or preceding the end of the diastole, may be constructed in a similar way. A method for constructing a sequence of mean model meshes in the mean model space, the sequence describing the human heart at different phases of cardiac cycle, is described in Ref. 2.

The model mesh is propagated by the system 100 based on the first mean model mesh and on the second mean model mesh. The propagated model mesh models the heart of the adult human at the second phase of cardiac cycle. All four meshes, the model mesh, the first mean model mesh, the second mean model mesh, and the propagated model mesh have the same topology.

The first mean model mesh and the second mean model mesh are typically described by coordinates of their vertices in a mean model space coordinate system. Typically the mean model space is described as a 3D Euclidean space. The relationship between the first mean model mesh and the second mean model mesh may be described by vectors of displacements of vertices of the second mean model mesh relative to respective vertices of the first model mesh in the mean model space coordinate system. The mean model space coordinate system may be based on a structure of the human anatomy, e.g. on the vertebra. In an embodiment of the system 100 the translation of the second mean model mesh relative to the first mean model mesh is eliminated, for example by translating the first mean model mesh and the second mean model mesh in such a way that both have the mass center at the same location, e.g. at the origin of the mean model space coordinate system. In an embodiment of the system 100 the rotation of the second mean model mesh relative to the first mean model mesh is eliminated, for example by aligning the axes of the inertia tensor of the first mean model mesh with the axes of the mean model space coordinate system and by aligning the axes of the inertia tensor of the second mean model mesh with the axes of the mean model space coordinate system. The skilled person will understand that there are other methods of defining the displacements of the second mean model mesh relative to the first mean model mesh, and that the methods described above illustrate the invention and do not limit the scope of the claims.

The registration unit 110 is arranged to compute a registration transformation R for registering the model mesh p with the first mean model mesh $m_1$. It is convenient to describe the model mesh p by coordinates of vertices of the model mesh p in a model space coordinate system. The registration transformation R of the model mesh may be then defined as a transformation of the coordinates of the model mesh. Typically, the computed registration transformation R is selected from a class C of transformations T of the model space. Each transformation T is specified by a number of parameters that are allowed to vary within a parameter-specific range. In an embodiment, the class C of transformations for computing the registration transformation R is the class of rigid transformations. Each rigid transformation may be specified by 6 independent parameters. In further embodiments the class C of transformations for computing the registration transformation R may be the class of similarity transformations or the class of affine transformations. Each similarity transformation is specified by 7 parameters and each affine transformation is specified by 12 parameters. In yet more general embodiment the class C of transformations for computing the registration transformation R may comprise piecewise affine transformations. The number of parameters specifying a piecewise affine transformation depends on the partition of the mean model space into domains of component affine transformations. The values of parameters of the registration transformation R may be computed, for example, by optimizing a cost function $d(T(p), m_1)$ as a function of the transformation T parameters. The cost function d may be easily defined using the coordinates of the model mesh p in the model space coordinate system and the coordinates of the mean model mesh $m_1$ in the mean model space coordinate system. For example, the cost function may be defined by a distance function between the vertices of the transformed model mesh T(p) described by their coordinates in the model mesh space coordinate system and the respective vertices of the first mean model mesh $m_1$ described by their coordinates in the mean model mesh space coordinate system. The optimization of the cost function may be minimization of the distance function. The distance function d may be a standard Euclidean metric or may be a Riemannian metric, for example. The skilled person will recognize that the described methods of registering the model mesh with the first mean model mesh illustrate the invention and do not limit the scope of the claims.

The forward transformation unit 120 is arranged to apply the registration transformation R computed by the registration unit 110 to the model mesh p. The registered model mesh R(p) is then transformed by the propagation unit 140 into the propagated registered model mesh F(R(p)) by applying the vertex displacement vectors of the propagation field F to respective vertices of the registered model mesh in the model space. The propagation field F of vertex displacement vectors is computed by the computation unit 130. The propagation field F comprises vectors of displacements of vertices of the second mean model mesh $m_2$ relative to respective vertices of the first mean model mesh $m_1$ in the mean model mesh space. The inverse transformation unit 150 is arranged to apply the inverse of the registration transformation R to the propagated registered model mesh F(R(p)) yielding the propagated model mesh $R^{-1}(F(R(p)))$.

Figure 2:
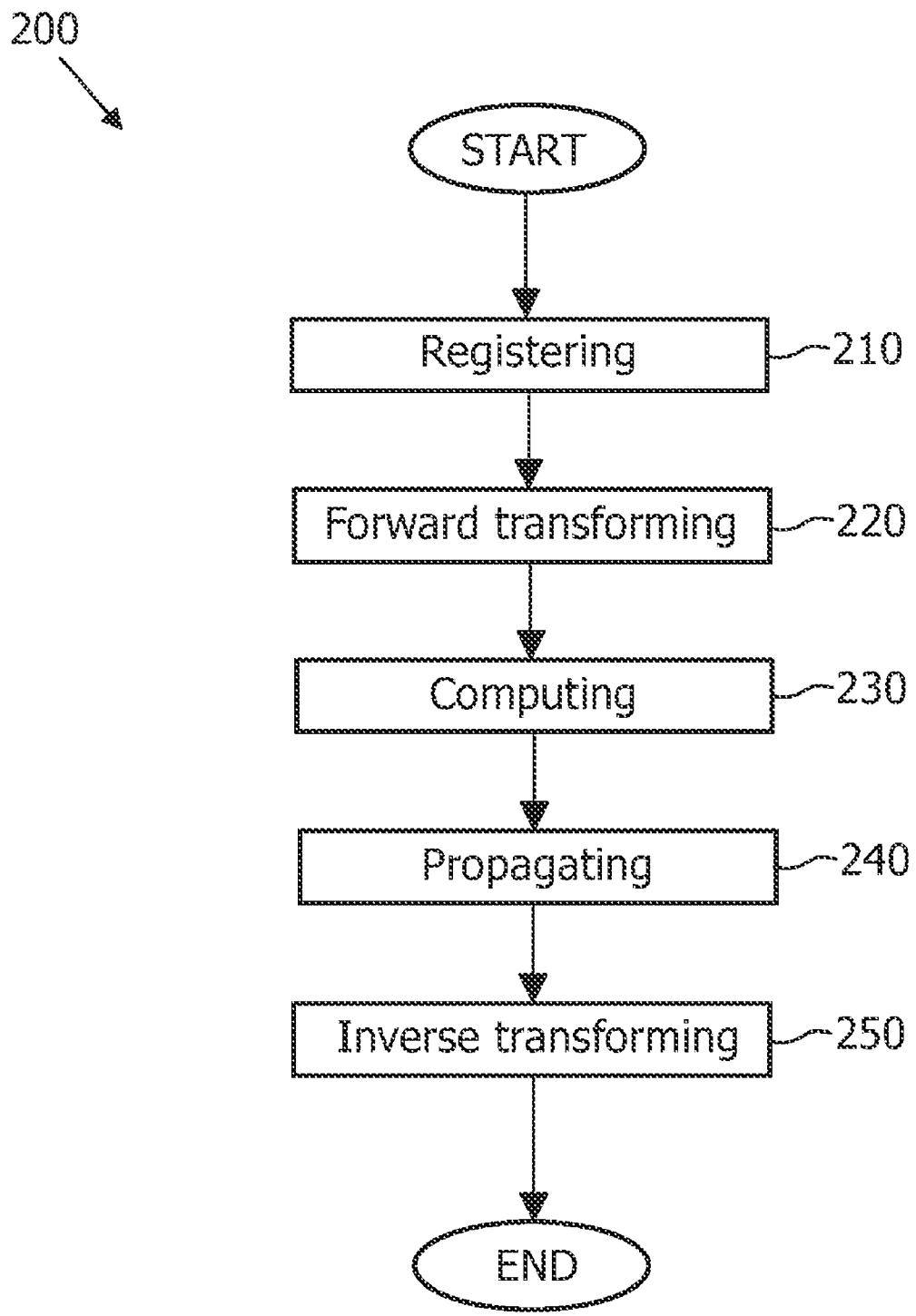
FIG. 2 shows a flowchart of an exemplary implementation of the method.
Figure 3:
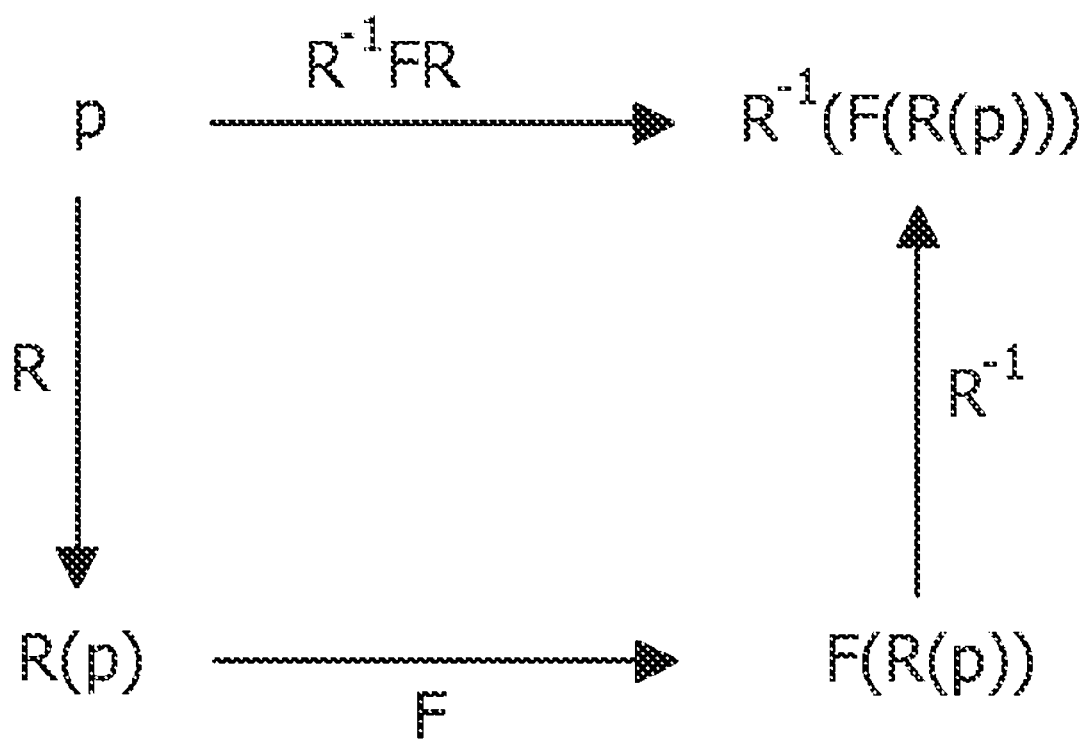
FIG. 3 shows a functional graph of an exemplary implementation of the method.

FIG. 2 shows a flowchart of an exemplary implementation of the method 200 of propagating a model mesh based on a first mean model mesh and on a second mean model mesh. The method begins with a registration step 210 for computing a registration transformation for registering the first model mesh with the first mean model mesh. After computing the registration transformation, the method 200 continues to a forward transformation step 220 for transforming the model mesh into a registered model mesh using the registration transformation. After the forward transformation step 220 the method 200 continues to a computation step 230 for computing a propagation field for propagating the registered model mesh, the propagation field comprising vectors of displacements of vertices of the second mean model mesh relative to respective vertices of the first mean model mesh. After the computation step 230 the method 200 continues to a propagation step 240 for transforming the registered model mesh into the propagated registered model mesh based on applying the vertex displacement vectors of the propagation field to respective vertices of the registered model mesh. Next, the method 200 continues to an inverse transformation step 250 for transforming the propagated registered model mesh into the propagated model mesh using the inverse of the registration transformation, thereby propagating the model mesh. After the inverse transformation step 250 the method 200 terminates. The steps of the method are summarized in FIG. 3 showing a functional graph of an exemplary implementation of the method 200.

Figure 4:
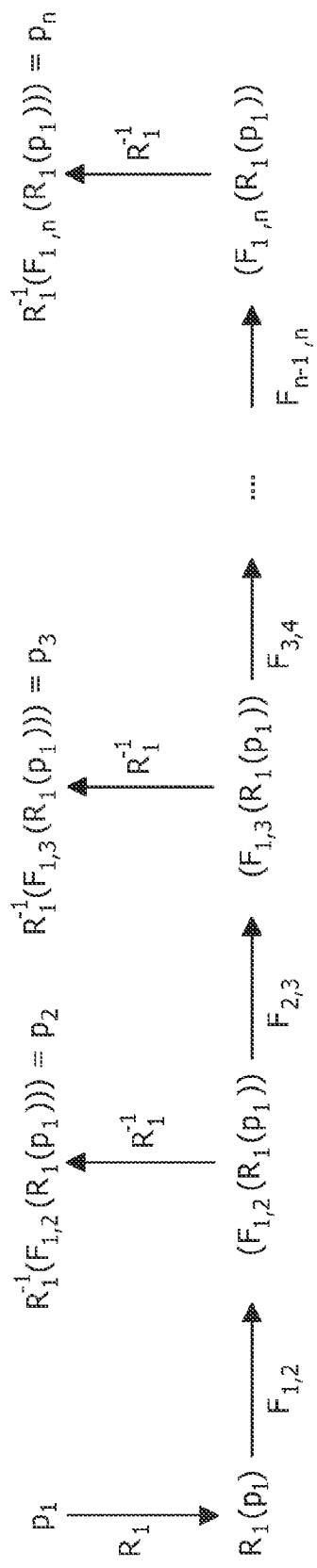
FIG. 4 shows a functional graph of a first exemplary implementation of multiple propagation of the model mesh based on the method.

In an embodiment of the system 100, the system 100 may be arranged to construct a sequence of model meshes ($p_1$, $p_2$, $p_3$, ..., $p_n$). FIG. 4 shows a functional graph of a first exemplary implementation of multiple propagation of the model mesh, also referred to as a first model mesh, based on the method 200. The registration unit 110 is arranged to compute the first registration transformation $R_1$ for registering the first model mesh $p_1$ with the first mean model mesh $m_1$. The system 100 transforms the first model mesh $p_1$ into the propagated first model mesh $R_1^{-1}F_{1,2}(R_1(p_1))$, also referred to as a second model mesh $p_2$. The propagation field $F_{1,2}$ computed by the computation unit 130 comprises vectors of displacements of vertices of the second mean model mesh $m_2$ relative to respective vertices of the first mean model mesh $m_1$ in the mean model mesh space coordinate system. The system 100 is further arranged to transform the first model mesh $p_1$ into another propagated first model mesh $R_1^{-1}(F_{1,3}(R_1(p_1)))$, also referred to as a third model mesh $p_3$. The propagation field $F_{1,3}$ computed by the computation unit 130 comprises vectors of displacements of vertices of the third mean model mesh $m_3$ relative to respective vertices of the first mean model mesh $m_1$ in the mean model mesh space coordinate system. The skilled person will understand that the vertex displacement vectors comprised in the propagation field $F_{1,3}$ are sums of the respective vertex displacement vectors of the propagation fields $F_{1,2}$ and $F_{2,3}$. Thus the third model mesh may be also obtained by applying the propagation field $F_{2,3}$ to the propagated registered first mesh $F_{1,2}(R_1(p_1))$. The propagation field $F_{2,3}$ may be computed by the computation unit 130 and comprises vectors of displacements of vertices of the third mean model mesh $m_3$ relative to respective vertices of the second mean model mesh $m_2$. The system 100 is iteratively used to propagate the first model mesh until the last propagated mesh $p_n = (R_1^{-1}(F_{1,n}(R_1(p_1))))$ is constructed, n being the number of model meshes in the sequence ($p_1$, $p_2$, $p_3$, ..., $p_n$). The propagation field $F_{1,n}$, computed by the computation unit 130, comprises vectors of displacements of vertices of the n-th mean model mesh $m_n$ relative to respective vertices of the first mean model mesh $m_1$ in the mean model mesh space coordinate system. The sequence of model meshes ($p_1$, $p_2$, $p_3$, ..., $p_n$) may describe an anatomical shape such as a heart in consecutive phases of cardiac cycle, and may be used to illustrate cardiac motion and displayed in a cine format, for example.

Figure 5:
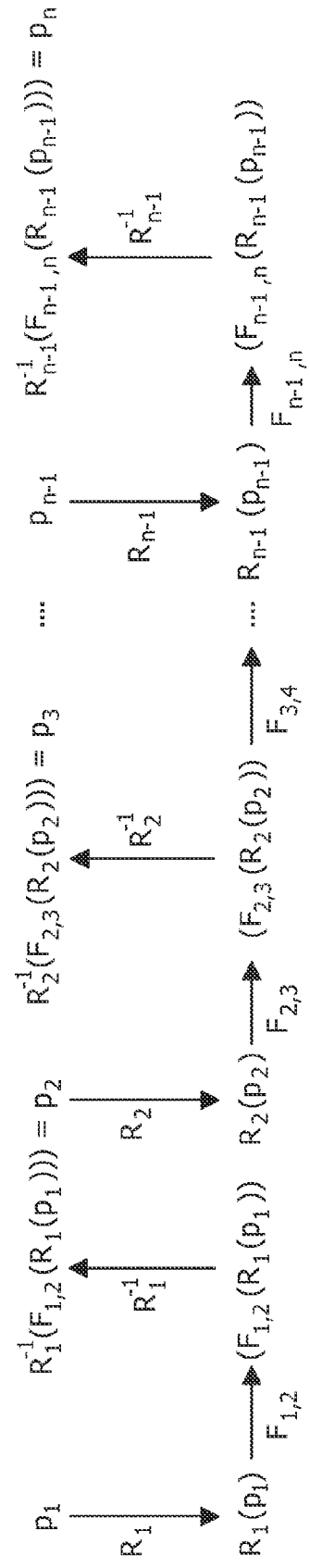
FIG. 5 shows a functional graph of a second exemplary implementation of multiple propagation of the model mesh based on the method.

In an embodiment of the system 100, the system 100 may be arranged to construct a sequence of model meshes ($p_1$, $p_2$, $p_3$, ..., $p_n$) in a different way. FIG. 5 shows a functional graph of a second exemplary implementation of multiple propagation of the model mesh, also referred to as a first model mesh, based on the method 200. The registration unit 110 is arranged to compute the first registration transformation $R_1$ for registering the first model mesh $p_1$ with the first mean model mesh $m_1$. The system 100 transforms the first model mesh $p_1$ into the propagated first model mesh $R_1^{-1}(F_{1,2}(R_1(p_1)))$, also referred to as a second model mesh $p_2$. The propagation field $F_{1,2}$ computed by the computation unit 130 comprises vectors of displacements of vertices of the second mean model mesh $m_2$ relative to respective vertices of the first mean model mesh $m_1$ in the mean model mesh space coordinate system. Next, the registration unit 110 is arranged to compute the second registration transformation $R_2$ for registering the second model mesh $p_2$ with the second mean model mesh $m_2$. The system 100 is further arranged to transform the second model mesh $p_2$ into the propagated second model mesh $R_2^{-1}(F_{2,3}(R_2(p_2)))$, also referred to as a third model mesh $p_3$. The propagation field $F_{2,3}$ computed by the computation unit 130 comprises vectors of displacements of vertices of the third mean model mesh $m_3$ relative to respective vertices of the second mean model mesh $m_2$ in the mean model mesh space coordinate system. The forward transformation step 220, the propagation step 240, and the inverse transformation step 250, implemented by the respective units of the system 100, are iteratively applied to transform a model mesh $p_{i-1}$ into a model mesh $p_i = (R_{i-1}^{-1}F_{i-1,i}R_{i-1})(p_{i-1})$, i=2, ..., n, until the last model mesh $p_n$ of the sequence is constructed. The registration transformation $R_{i-1}$ for registering the model mesh $p_{i-1}$ with the mean model mesh $m_{i-1}$ is computed by the registration unit 110. The propagation field $F_{i-1,i}$ computed by the computation unit 130 comprises vectors of displacements of vertices of the second mean model mesh $m_i$ relative to respective vertices of the first mean model mesh $m_{i-1}$ in the mean model mesh space coordinate system. The sequence of model meshes $(p_1, p_2, p_3, \ldots, p_n)$ may describe an anatomical shape such as a heart in consecutive phases of cardiac cycle, and may be used to illustrate cardiac motion and displayed in a cine format, for example.

The computational cost of the second exemplary implementation of the multiple propagation of the model mesh is slightly higher than the computational cost of the first exemplary implementation of the multiple propagation of the model mesh. The computational cost may be determined by the use of processor bandwidth and/or of computational time. However, the model meshes of the sequence $(p_1, p_2, p_3, \ldots, p_n)$ computed using the second exemplary implementation of the multiple propagation of the model mesh may describe the modeled anatomical shape better than the model meshes of the sequence $(p_1, p_2, p_3, \ldots, p_n)$ computed using the first exemplary implementation of the multiple propagation of the model mesh.

Figure 6:
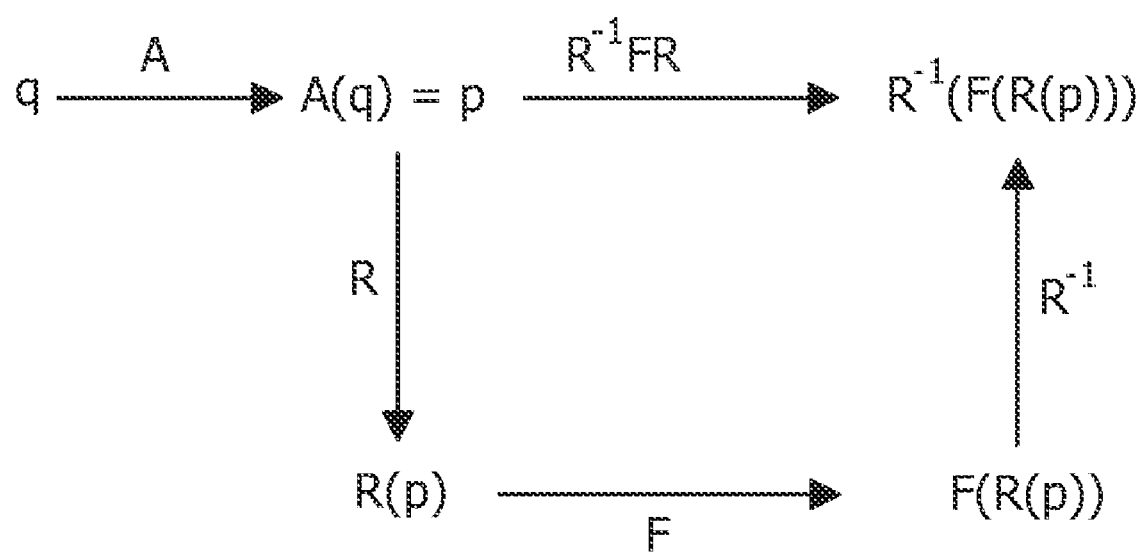
FIG. 6 shows a functional graph of an exemplary implementation of the method comprising the adaptation step.

In an embodiment of the system 100, the system 100 further comprises an adaptation unit 102 for adapting a mesh to an image data. A suitable adaptation method for adapting triangular meshes is described in Ref. 3. The skilled person will understand that other adaptation methods described in the literature may also be employed by the system 100 and that the scope of the claims is not limited by the choice of a particular adaptation method. The image data may describe the heart of an adult human at a phase of cardiac cycle. The adaptation unit 102 is arranged to adapt a mesh q to the image data thereby constructing an adapted mesh p. The adapted mesh p is the model mesh to be propagated by the system 100. The effect of adapting the mesh q to the image data may be also described as transforming the mesh q into the adapted mesh $p=A(q)$ using an adaptation transformation A. The adapted mesh $A(q)$ may be the model mesh p. The adapted mesh $p=A(q)$ may be further propagated by the units of the system 100. FIG. 6 shows a functional graph of an exemplary implementation of the method comprising the adaptation step.

An adaptation step for constructing the model mesh based on adapting a mesh to an image data may be implemented in the method 200. In the adaptation step, the method 200 may transform the mesh q into the model mesh $p=A(q)$ using the adaptation transformation A.

In an embodiment of the system 100, the system 100 further comprises a construction unit (104) for constructing the first mean model mesh based on a first training image data set and for constructing the second mean model mesh based on a second training image data set. The construction unit allows constructing the first mean model and the second mean model. The first mean model mesh may be a model mesh for modeling a "mean" adult-human-heart at a first phase of cardiac cycle. The first mean model mesh may be constructed based on a plurality of meshes describing a plurality of hearts of a plurality of adult humans. The first mean model mesh may be constructed using Procrustes analysis and/or principal component analysis (PCA) of the plurality of meshes. Procrustes analysis and PCA are described in Ref. 4. Each mesh from the plurality of meshes may be obtained by adapting a mesh to a training image from a plurality of training images wherein each training image describes a heart of an adult human from the plurality of adult humans at the first phase of cardiac cycle. A method of constructing the plurality of meshes based on the plurality of training images is described in Ref. 5. The second mean model mesh for modeling the heart at a second phase may be constructed in a similar way. A method for constructing a sequence of mean model meshes in the mean model space, the sequence describing the human heart at different phases of cardiac cycle, is described in Ref. 2.

A construction step for constructing the first mean model mesh based on a first training image data set and for constructing the second mean model mesh based on a second training image data set may be implemented in the method 200.

The system 100 and the method 200 may be used to model variability of an anatomical shape other than time-dependent variability. For example, for a population of patients, variability of an anatomical shape due to the patient's age, due to the stage of a disease, or due to the patient's weight may be modeled. Although the embodiments of the system and the implementations of the method are illustrated using the heart as an exemplary anatomical shape, the skilled person will appreciate that the system is useful for describing variability of other anatomical shapes such as lever, kidney and stomach, for example. Thus, the type of variability and the type of the anatomical shapes used in the description of embodiments do not limit the scope of the claims.

The skilled person will further understand that other embodiments of the system 100 are also possible. It is possible, among other things, to redefine the units of the system and to redistribute their functions. For example, in an embodiment of the system 100, the functions of the registration unit 110 may be combined with the functions of the first transformation unit 120. In a further embodiment of the system 100, there can be a plurality of registration units replacing the computation unit 110. Each registration unit from the plurality of registration units may be arranged to employ different registration algorithm. The employed algorithm may be based on a user selection.

The units of the system 100 may be implemented using a processor. Normally, their functions are performed under control of a software program product. During execution, the software program product is normally loaded into a memory, like a RAM, and executed from there. The program may be loaded from a background memory, like a ROM, hard disk, or magnetic and/or optical storage, or may be loaded via a network like Internet. Optionally an application specific integrated circuit may provide the described functionality.

The order of steps in the method 200 of computing an image comprising a first image and a second image is not mandatory, the skilled person may change the order of some steps or perform some steps concurrently using threading models, multi-processor systems or multiple processes without departing from the concept as intended by the present invention. Optionally, two or more steps of the method 100 of the current invention may be combined into one step. Optionally, a step of the method 100 of the current invention may be split into a plurality of steps. Some steps of the method 100 are optional and may be omitted.

Figure 7:
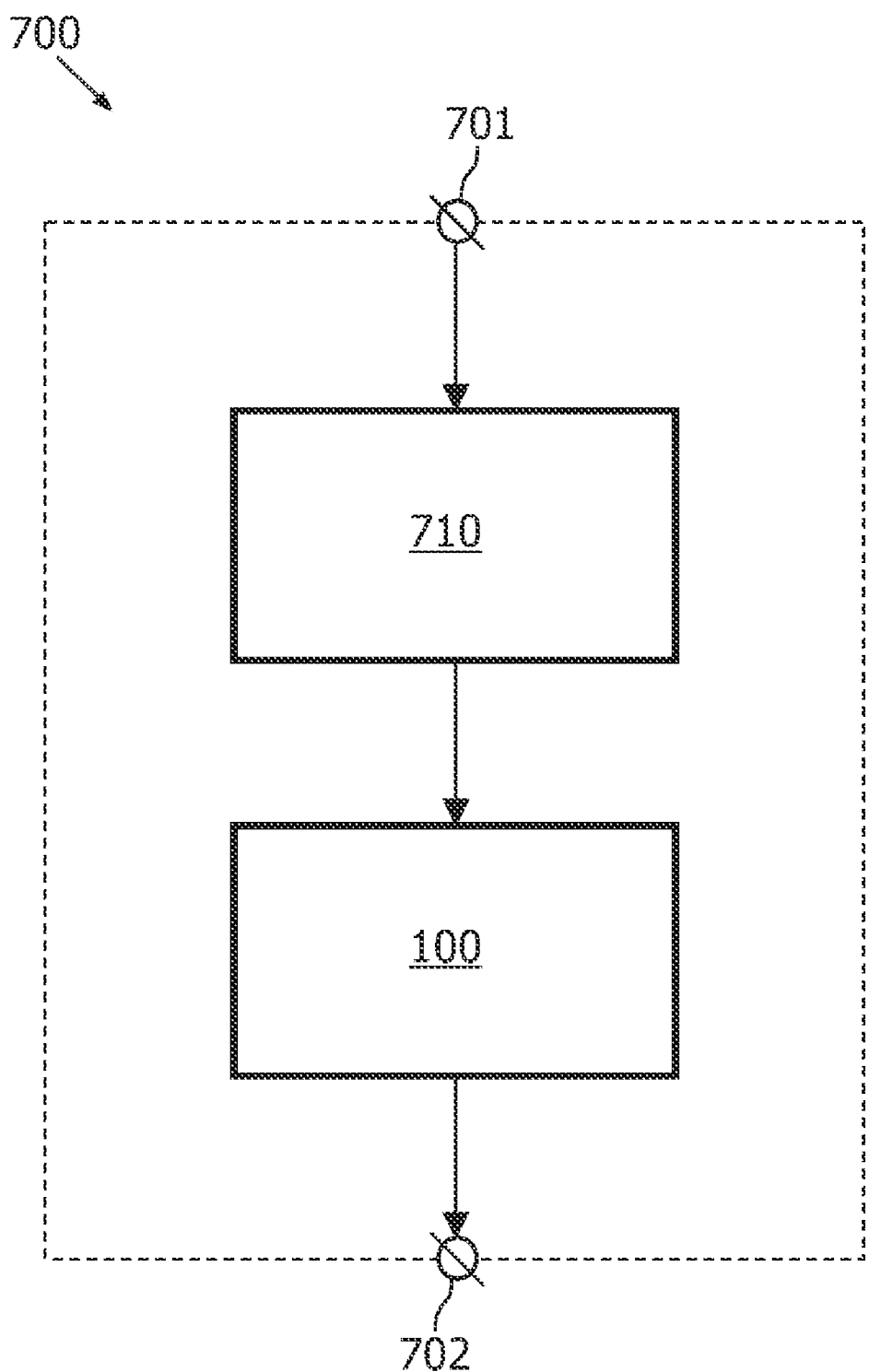
FIG. 7 schematically shows an exemplary embodiment of the image acquisition apparatus.

FIG. 7 schematically shows an exemplary embodiment of the image acquisition apparatus 700 employing the system 100, said image acquisition apparatus 700 comprising an image acquisition unit 710 connected via an internal connection with the system 100, an input connector 701, and an output connector 702. This arrangement advantageously increases the capabilities of the image acquisition apparatus 700 providing said image acquisition apparatus 700 with advantageous capabilities of the system 100 for propagating a model mesh based on a first mean model mesh and on a second mean model mesh. Examples of image acquisition apparatus comprise, but are not limited to, a CT system, an X-ray system, an MRI system, an US system, a PET system, a SPECT system, and a NM system.

Figure 8:
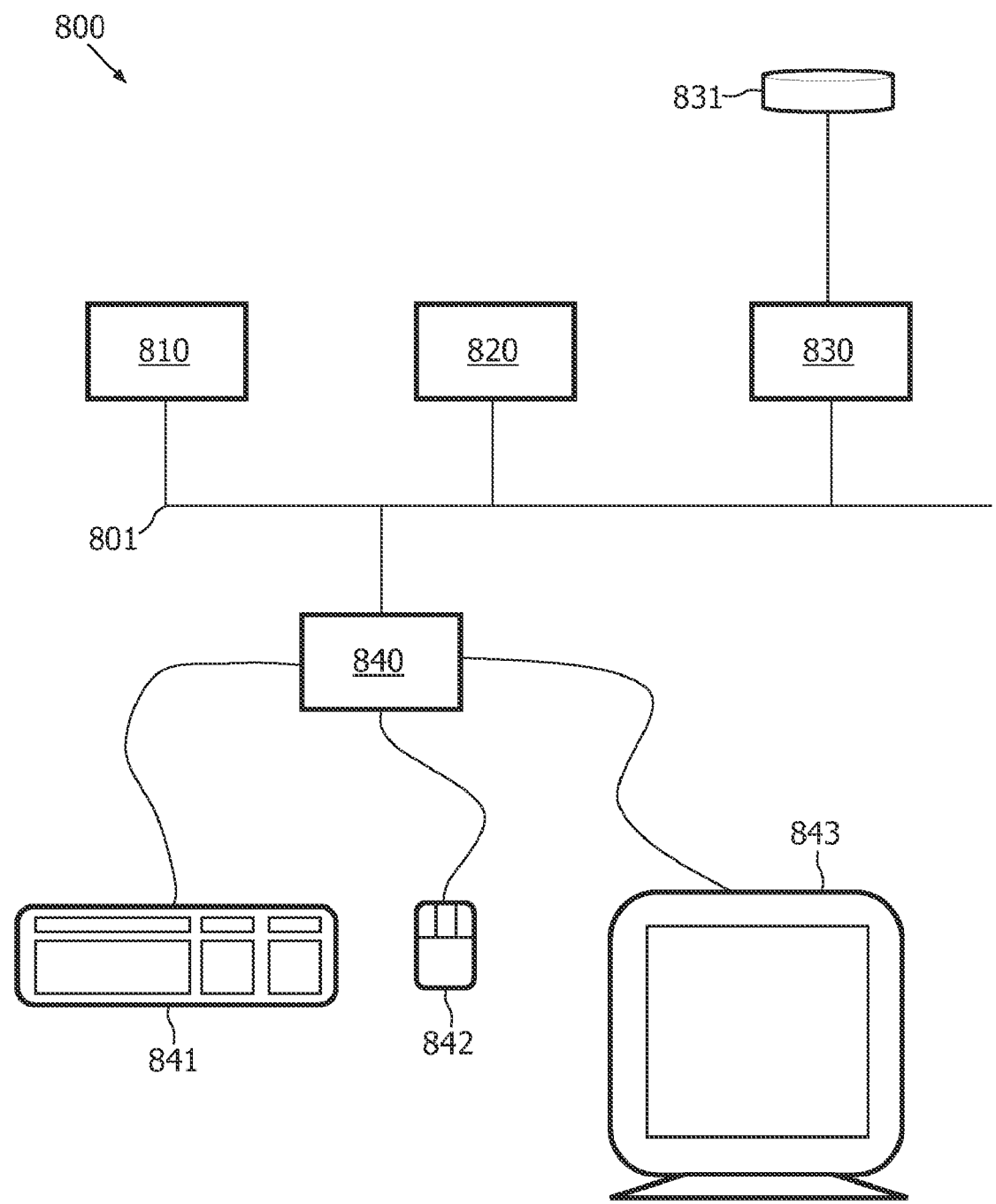
FIG. 8 schematically shows an exemplary embodiment of the workstation.

FIG. 8 schematically shows an exemplary embodiment of the workstation 800. The workstation comprises a system bus 801. A processor 810, a memory 820, a disk input/output (I/O) adapter 830, and a user interface (UT) 840 are operatively connected to the system bus 801. A disk storage device 831 is operatively coupled to the disk I/O adapter 830. A keyboard 841, a mouse 842, and a display 843 are operatively coupled to the UT 840. The system 100 of the invention, implemented as a computer program, is stored in the disk storage device 831. The workstation 800 is arranged to load the program and input data into memory 820 and execute the program on the processor 810. The user can input information to the workstation 800 using the keyboard 841 and/or the mouse 842. The workstation is arranged to output information to the display device 843 and/or to the disk 831. The skilled person will understand that there are numerous other embodiments of the workstation 800 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second and third, et cetera does not indicate any ordering. These words are to be interpreted as names.

The invention claimed is:

1. A system for propagating a model mesh based on a first mean model mesh and on a second mean model mesh, the system comprising:
   a registration unit computing a registration transformation for registering the model mesh with the first mean model mesh;
   a forward transformation unit transforming the model mesh into a registered model mesh using the registration transformation;
   a computation unit computing a propagation field for propagating the registered model mesh, the propagation field comprising vectors of displacements of vertices of the second mean model mesh relative to respective vertices of the first mean model mesh;
   a propagation unit transforming the registered model mesh into a propagated registered model mesh based on applying the vertex displacement vectors comprised in the propagation field to respective vertices of the registered model mesh; and
   an inverse transformation unit transforming the propagated registered model mesh into the propagated model mesh using the inverse of the registration transformation, thereby propagating the model mesh.

2. The system as claimed in claim 1, further comprising an adaptation unit constructing the model mesh based on adapting a mesh to an image data.

3. The system as claimed in claim 1, wherein the first mean model mesh describes a modeled anatomical shape at a first time moment and the second mean model mesh describes the modeled anatomical shape at a second time moment.

4. The system as claimed in claim 1 wherein the registration transformation is an affine transformation.

5. An image acquisition apparatus comprising the system as claimed in claim 1.

6. A workstation comprising the system as claimed in claim 1.

7. The system as claimed in claim 1, wherein a plurality of the first mean model mesh, the second mean model mesh, and the model mesh have the same mesh topology.

8. The system as claimed in claim 1, further comprising a construction unit constructing the first mean model mesh based on a first training image data set and constructing the second mean model mesh based on a second training image data set.

9. The system as claimed in claim 8, wherein the first mean model mesh and the second mean model mesh share a common coordinate system, and wherein the construction unit translates the first mean model mesh and the second mean model mesh such that a mass center of the first mean model mesh and a mass center of the second mean model mesh share a common location in the common coordinate system.

10. The system as claimed in claim 8, wherein the first mean model mesh and the second mean model mesh share a common coordinate system, and wherein the construction unit is configured to:
    align axes of inertia tensor of the first mean model mesh with axes of the common coordinate system; and,
    align axes of axes of inertia tensor of the second mean model mesh with the axes of the common coordinate system.

11. The system as claimed in claim 3, wherein the model mesh describes the modeled anatomical shape at the first time moment.

12. The system as claimed in claim 1, wherein the computation unit computes a second propagation field, the second propagation field comprising vertices displacement vectors which displace a third mean model mesh relative to respective vertices of the second mean model mesh;
    wherein the propagation unit transforms a second registered model mesh into a second propagated registered model mesh based on applying the vertex displacement vectors comprised in the second propagation field to respective vertices of the second registered model mesh, the second registered model mesh being one of the propagated registered model mesh and the propagated model mesh as registered with the second mean model mesh using a second registration transformation; and,
    wherein the inverse transformation unit transforms the second propagated registered model mesh into a second propagated model mesh using the inverse of one of the registration transformation and the second registration transformation.

13. The system as claimed in claim 12,
    wherein the propagation unit transforms the propagated registered model mesh into the second propagated registered model mesh based on applying the vertex displacement vectors comprised in the second propagation field to respective vertices of the propagated registered model mesh; and,
    wherein the inverse transformation unit transforms the second propagated registered model mesh into the second propagated model mesh using the inverse of the registration transformation.

14. The system as claimed in claim 12, wherein the registration unit computes the second registration transformation for registering the propagated model mesh with the second mean model mesh;
  wherein the forward transformation unit transforms the propagated model mesh into the second registered model mesh using the second registration transformation;
  wherein the propagation unit transforms the second registered model mesh into the second propagated registered model mesh based on applying the vertex displacement vectors comprised in the second propagation field to respective vertices of the second registered model mesh; and,
  wherein the inverse transformation unit transforms the second propagated registered model mesh into the second propagated model mesh using the inverse of the second registration transformation.

15. A method of propagating a model mesh based on a first mean model mesh and on a second mean model mesh, the method comprising:
  computing, by a processor, a registration transformation for registering the first model mesh with the first mean model mesh;
  transforming the model mesh into a registered model mesh using the registration transformation;
  computing a propagation field for propagating the registered model mesh, the propagation field comprising vectors of displacements of vertices of the second mean model mesh relative to respective vertices of the first mean model mesh;
  transforming the registered model mesh into the propagated registered model mesh based on applying the vertex displacement vectors comprised in the propagation field to respective vertices of the registered model mesh; and
  transforming the propagated registered model mesh into the propagated model mesh using the inverse of the registration transformation, thereby propagating the model mesh.

16. A computer program product embodied on a non-transitory computer readable medium to be loaded by a computer arrangement, comprising instructions for controlling one or more processors to perform the method as claimed in claim 15.

17. A system for propagating a model mesh based on a first mean model mesh and a second mean model mesh, the system comprising:
  one or more processors programmed to perform the method as claimed in claim 15.

18. The method as claimed in claim 15, further including:
  computing a second propagation field, the second propagation field comprising vertices displacement vectors which displace a third mean model mesh relative to respective vertices of the second mean model mesh;
  transforming a second registered model mesh into a second propagated registered model mesh based on applying the vertex displacement vectors comprised in the second propagation field to respective vertices of the second registered model mesh, the second registered model mesh being one of the propagated registered model mesh and the propagated model mesh as registered with the second mean model mesh using a second registration transformation; and,
  transforming the second propagated registered model mesh into a second propagated model mesh using the inverse of one of the registration transformation and the second registration transformation.

19. A system for propagating a model mesh, the system comprising:
  a processor programmed to:
    compute a registration transformation which registers the model mesh to a first mean model mesh;
    transform the model mesh into a registered model mesh using the registration transformation;
    compute a propagation field which propagates the registered model mesh, the propagation field including vertex displacement vectors which displace vertices of a second mean model mesh relative to respective vertices of the first mean model mesh;
    applying the vertex displacement vectors of the propagation field to respective vertices of the registered model mesh to transform the registered model mesh into the propagated registered model mesh; and,
    transform the propagated registered model mesh into the propagated model mesh using an inverse of the registration transformation to propagate the model mesh.

20. The system as claimed in claim 19, wherein the first mean model mesh and the second mean model mesh share a common coordinate system, and wherein the processor is further programmed to:
  construct the first mean model mesh based on a first training image data set;
  align axes of inertia tensor of the first mean model mesh with axes of the common coordinate system;
  construct the second mean model mesh based on a second training image data set; and,
  align axes of axes of inertia tensor of the second mean model mesh with the axes of the common coordinate system.

* * * * *